United States Patent
Futa, Jr. et al.

(10) Patent No.: US 10,472,050 B2
(45) Date of Patent: Nov. 12, 2019

(54) PROPELLER PITCH CONTROL ACTUATION SYSTEM

(71) Applicant: HONEYWELL INTERNATIONAL INC., Morris Plains, NJ (US)

(72) Inventors: Paul W. Futa, Jr., North Liberty, IN (US); Dugan Shelby, Mishawaka, IN (US); Martin Dutka, South Bend, IN (US); Brad McRoberts, Mishawaka, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 620 days.

(21) Appl. No.: 15/252,333

(22) Filed: Aug. 31, 2016

(65) Prior Publication Data

US 2018/0057146 A1     Mar. 1, 2018

(51) Int. Cl.
*B64C 11/38*     (2006.01)
*B64C 27/64*     (2006.01)

(52) U.S. Cl.
CPC ............ *B64C 11/38* (2013.01); *B64C 11/385* (2013.01); *B64C 27/64* (2013.01)

(58) Field of Classification Search
CPC ....... B64C 11/38; B64C 11/385; B64C 27/64; F01D 17/26
USPC ....................... 416/26, 27, 46, 153
See application file for complete search history.

(56) References Cited

U.S. PATENT DOCUMENTS

| | | | |
|---|---|---|---|
| 2,889,888 A | | 6/1959 | Gaskell |
| 2,927,648 A | * | 3/1960 | Lambeck ............... B64C 11/385 416/46 |
| 3,175,620 A | | 3/1965 | Newton |
| 4,863,347 A | * | 9/1989 | Trott ....................... B64C 11/38 416/46 |
| 5,174,718 A | | 12/1992 | Lampeter et al. |
| 5,836,743 A | | 11/1998 | Carvalho et al. |
| 2010/0135799 A1 | * | 6/2010 | Morgan ................ B64C 11/385 416/44 |
| 2012/0070291 A1 | * | 3/2012 | Marly .................... B64C 11/385 416/157 B |
| 2013/0280065 A1 | | 10/2013 | Danielson et al. |
| 2013/0323050 A1 | * | 12/2013 | Kleckler ................... F02C 9/58 416/1 |

FOREIGN PATENT DOCUMENTS

FR     2964945 A1     3/2012

OTHER PUBLICATIONS

Extended EP Search Report for Application No. 17186225.3-1754 dated Nov. 17, 2017.

* cited by examiner

*Primary Examiner* — Jason D Shanske
*Assistant Examiner* — Aye S Htay
(74) *Attorney, Agent, or Firm* — Lorenz & Kopf, LLP

(57) ABSTRACT

A propeller pitch control actuation system includes a relatively lightweight, relatively inexpensive means for selectively preventing the propeller pitch control actuator from commanding reverse pitch positions.

12 Claims, 3 Drawing Sheets

PROPELLER PITCH CONTROL ACTUATION SYSTEM

TECHNICAL FIELD

The present invention generally relates to propeller pitch control, and more particularly relates to a propeller pitch control actuator.

BACKGROUND

Some aircraft, both fixed-wing and rotary aircraft, include one or more propeller blades driven by a gas turbine engine. Such aircraft may include a hydraulically actuated propeller pitch control actuation system that is configured to adjust and maintain a pitch of the propeller blades. Generally, the pitch of the propeller blades corresponds to an amount of thrust generated by the propeller blades. In some aircraft, the blade pitch angle can be reversed. This causes the engine to generate a reverse thrust, which can be used to help slow the aircraft after landing.

As may be appreciated, reverse thrust propeller pitch angle is preferably prevented on fixed wing aircraft, unless or until the aircraft is on the ground. To provide this functionality, the aircraft will include a mechanism, independent of the primary propeller pitch control architecture, to prevent unintended thrust reversal. One particular mechanism that is presently used is a pin that is inserted into a hole or slot to mechanically prevent the propeller pitch control actuator from commanding reverse pitch positions. The position of the pin is controlled by a solenoid that retracts the pin, allowing the actuator to travel to reverse prop pitch positions.

Although the above-described architecture is generally effective, it does exhibit certain drawbacks. For example, it is relatively heavy and relatively costly. Hence, there is a need for a propeller pitch control actuation system that includes a relatively lightweight, relatively inexpensive means for selectively preventing the propeller pitch control actuator from commanding reverse pitch positions. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propeller pitch control actuation system includes an actuator body, a propeller pitch control actuator, a reverse lockout valve body, a reverse lockout valve, a check valve body, and a check valve. The actuator body includes a first head-end fluid port, a second head-end fluid port, and a rod-end fluid port. The propeller pitch control actuator is movably disposed within the actuator body and is movable, in response to differential fluid pressure between the rod-end fluid port and one or both of the first and second head-end fluid ports, to an actuator position. The reverse lockout valve body has a first fluid control port and a second fluid control port. The first fluid control port is in fluid communication with the first head-end fluid port, and the second fluid control port in fluid communication with the second head-end fluid port. The reverse lockout valve is disposed within the reverse lockout valve body and is selectively moveable between (i) a closed position, in which the valve prevents fluid flow to and from the first head-end fluid port via the reverse lockout valve body, and (ii) an open position, in which the valve allows fluid flow to and from the first head-end fluid port via the reverse lockout valve body. The check valve body has a fluid inlet port and a fluid outlet port. The fluid inlet port is in fluid communication with the second head-end fluid port and the second fluid control port, and the fluid outlet port is in fluid communication with the first head-end fluid port and the first fluid control port. The check valve is disposed within the check valve body and is movable between (i) a closed position, in which fluid is prevented from flowing through the check valve body and into the first head-end fluid port, and (ii) an open position, in which fluid may flow through the check valve body and into the first head-end fluid port.

In another embodiment, propeller pitch control actuation system includes an actuator body, a propeller pitch control actuator, a reverse lockout valve body, a reverse lockout valve, a check valve body, a check valve, a position control valve body, and a position control valve. The actuator body includes a first head-end fluid port, a second head-end fluid port, and a rod-end fluid port. The propeller pitch control actuator is movably disposed within the actuator body and is movable, in response to differential fluid pressure between the rod-end fluid port and one or both of the first and second head-end fluid ports, to an actuator position. The reverse lockout valve body has a first fluid control port and a second fluid control port. The first fluid control port is in fluid communication with the first head-end fluid port, and the second fluid control port in fluid communication with the second head-end fluid port. The reverse lockout valve is disposed within the reverse lockout valve body and is selectively moveable between (i) a closed position, in which the valve prevents fluid flow to and from the first head-end fluid port via the reverse lockout valve body, and (ii) an open position, in which the valve allows fluid flow to and from the first head-end fluid port via the reverse lockout valve body. The check valve body has a fluid inlet port and a fluid outlet port. The fluid inlet port is in fluid communication with the second head-end fluid port and the second fluid control port, and the fluid outlet port is in fluid communication with the first head-end fluid port and the first fluid control port. The check valve is disposed within the check valve body and is movable between (i) a closed position, in which fluid is prevented from flowing through the check valve body and into the first head-end fluid port, and (ii) an open position, in which fluid may flow through the check valve body and into the first head-end fluid port. The position control valve body has a supply pressure port, a return pressure port, a head pressure port, and a rod pressure port. The head pressure port is in fluid communication with the second head-end fluid port and the second head-end fluid control port, and the rod pressure port is in fluid communication with the rod-end fluid port. The position control valve is disposed within the position control valve body and is moveable between a pitch locked position, a positive thrust position, and a reverse thrust position. In the pitch locked position, the supply pressure port and the return pressure port are both fluidly isolated from the head pressure port and the rod pressure port. In the positive thrust position, the supply pressure port is in fluid communication with the head pressure port, and the return pressure port is in fluid communication with the rod pressure port. In the reverse thrust position, the supply pressure port is in fluid communication with the rod pressure port, and the return pressure port is in fluid communication with the head pressure port.

In yet another embodiment, a propeller pitch control actuation system includes an actuator body, a propeller pitch control actuator, a reverse lockout valve body, a reverse lockout valve, a reverse lockout valve actuator, a check valve body, a check valve, and a control. The actuator body includes a first head-end fluid port, a second head-end fluid port, and a rod-end fluid port. The propeller pitch control actuator is movably disposed within the actuator body and is movable, in response to differential fluid pressure between the rod-end fluid port and one or both of the first and second head-end fluid ports, to an actuator position. The reverse lockout valve body has a first fluid control port and a second fluid control port. The first fluid control port is in fluid communication with the first head-end fluid port, and the second fluid control port in fluid communication with the second head-end fluid port. The reverse lockout valve is disposed within the reverse lockout valve body and is selectively moveable between (i) a closed position, in which the valve prevents fluid flow to and from the first head-end fluid port via the reverse lockout valve body, and (ii) an open position, in which the valve allows fluid flow to and from the first head-end fluid port via the reverse lockout valve body. The reverse lockout valve actuator is coupled to the reverse lockout valve, and is configured to selectively move the reverse lockout valve between the closed position and the open position. The check valve body has a fluid inlet port and a fluid outlet port. The fluid inlet port is in fluid communication with the second head-end fluid port and the second fluid control port, and the fluid outlet port is in fluid communication with the first head-end fluid port and the first fluid control port. The check valve is disposed within the check valve body and is movable between (i) a closed position, in which fluid is prevented from flowing through the check valve body and into the first head-end fluid port, and (ii) an open position, in which fluid may flow through the check valve body and into the first head-end fluid port. The control is coupled to the reverse lockout actuator and is configured to command the reverse lockout valve actuator to move the reverse lockout valve between the closed position and the open position.

Furthermore, other desirable features and characteristics of the propeller pitch control actuation system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
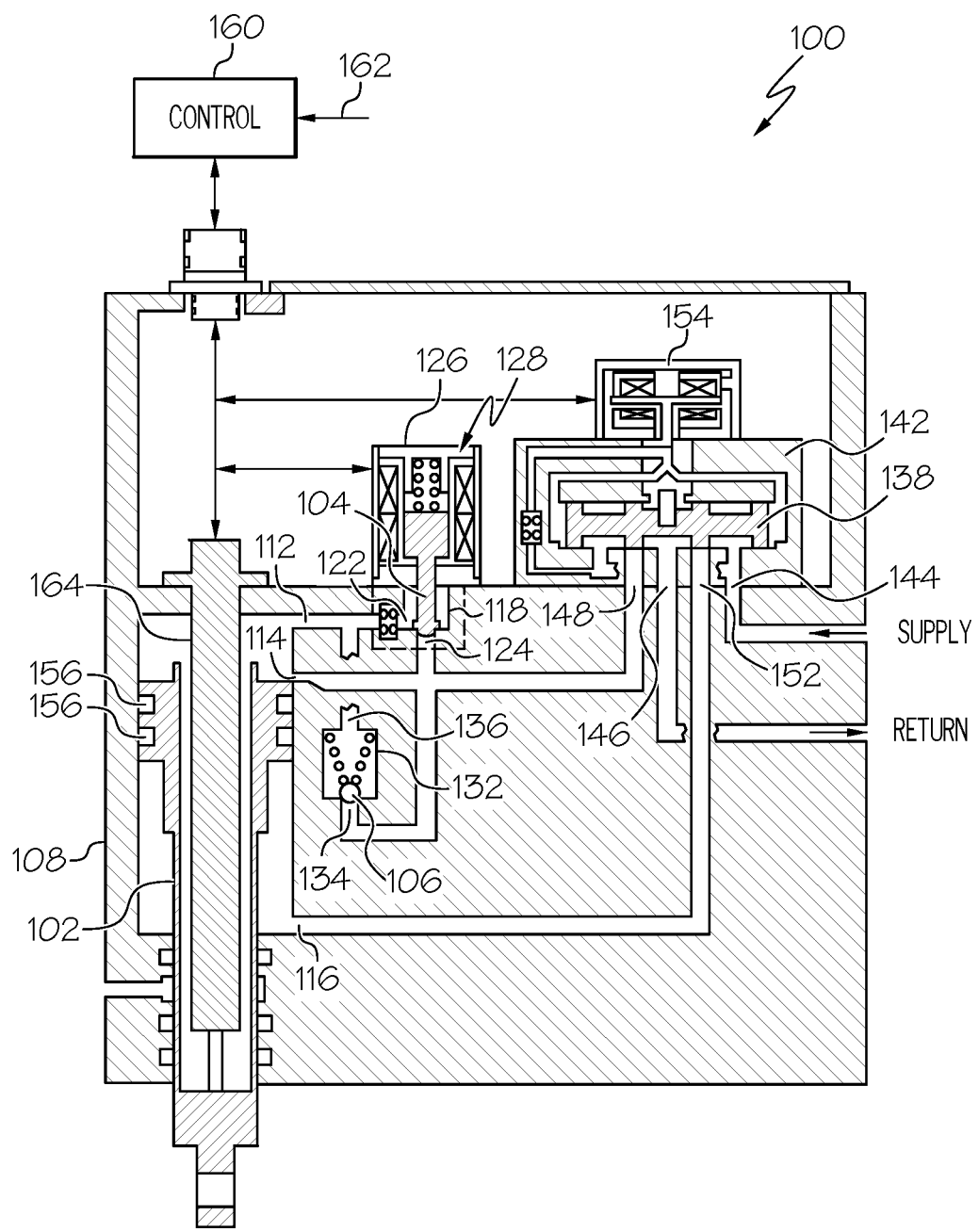
FIG. 1 depicts a cross section schematic representation of one embodiment of a propeller pitch control actuation system.

Referring to FIG. 1, a cross section schematic representation of one embodiment of a propeller pitch control actuation system 100 is depicted. The depicted system 100 includes a propeller pitch control actuator 102, a reverse lockout valve 104, and a check valve 106. The propeller pitch control actuator 102 is disposed within an actuator body 108, and is moveable therein to various actuator positions. More specifically, the actuator body 108 includes a first head-end fluid port 112, a second head-end fluid port 114, and a rod-end fluid port 116, and the propeller pitch control actuator 102 is movable, in response to differential fluid pressure between the rod-end fluid port 116 and one or both of the first and second head-end fluid ports 112, 114, to an actuator position. Although not depicted, it will be appreciated that the propeller pitch control actuator 102 may be coupled to a variable pitch propeller via, for example, a non-illustrated beta tube.

Figure 2:
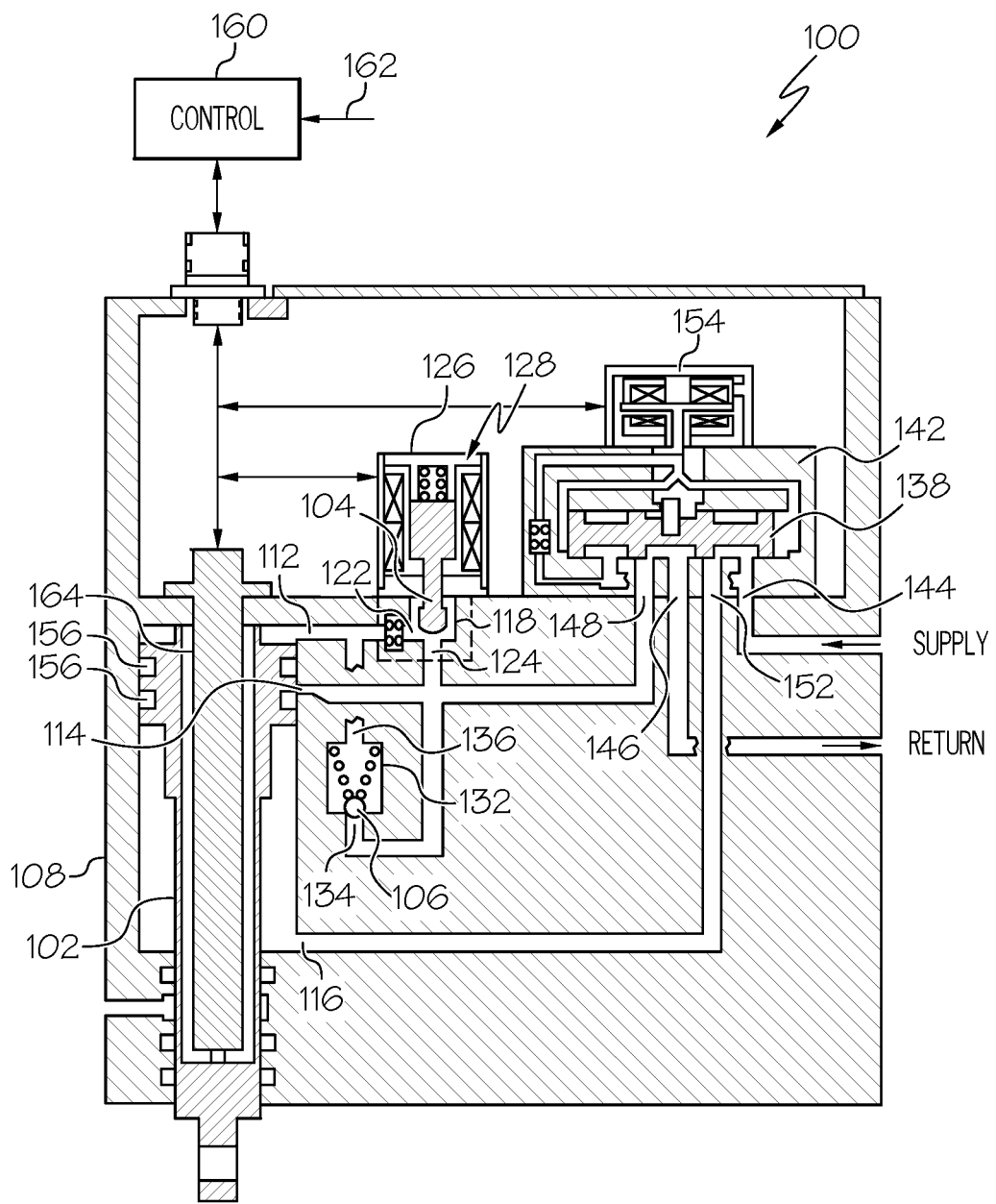
FIG. 2 depicts a cross section schematic representation of the propeller pitch control actuation system of FIG. 1 in a reverse thrust position.
Figure 3:
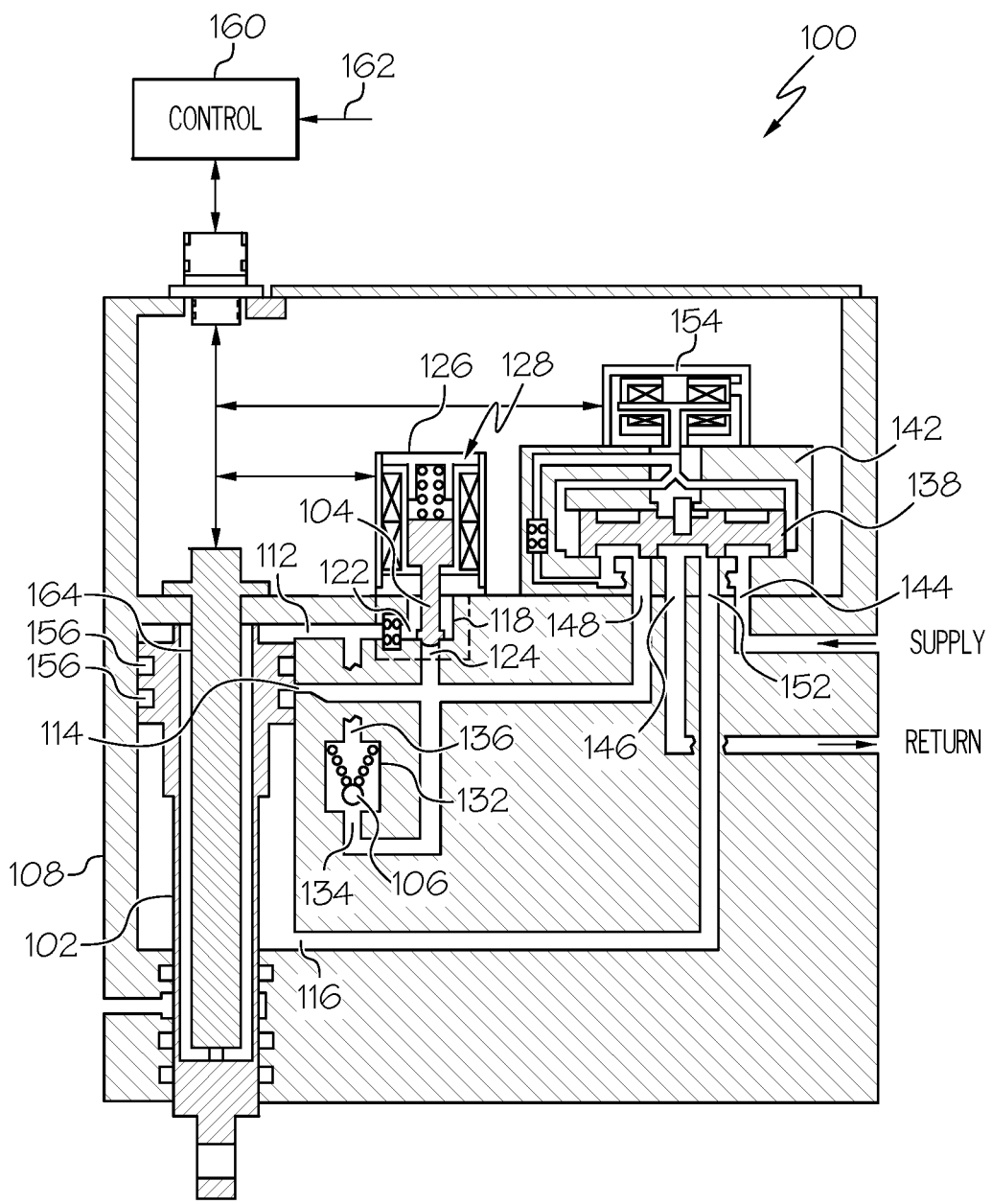
FIG. 3 depicts a cross section schematic representation of the propeller pitch control actuation system of FIG. 1 in a reverse thrust position but being commanded to a positive thrust pitch position.

The reverse lockout valve 104 is disposed within a reverse lockout valve body 118, and is moveable therein between a closed position, which is the position depicted in FIGS. 1 and 3, and an open position, which is the position depicted in FIG. 2. The reverse lockout valve body 118 includes a first fluid control port 122 and a second fluid control port 124. The first fluid control port 122 is in fluid communication with the first head-end fluid port 112, and the second fluid control port 124 is in fluid communication with the second head-end fluid port 114. Thus, as FIGS. 1 and 3 depict, when the reverse lockout valve 104 is in the closed position, fluid flow to and from the first head-end fluid port 112 via the reverse lockout valve body 118 is prevented. And, as FIG. 2 depicts, when the reverse lockout valve 104 is in the open position, fluid flow to and from the first head-end fluid port 112 via the reverse lockout valve body 118 is allowed.

Movement of the reverse lockout valve 104 is controlled by an actuator, which is referred to herein as a reverse lockout valve actuator 126. The reverse lockout valve actuator 126 is coupled to the reverse lockout valve 104 and is configured to selectively move the reverse lockout valve 104 between the closed position and the open position. Although the reverse lockout valve actuator 126 may be implemented using any one of numerous known electric, hydraulic, or pneumatic actuators, in the depicted embodiment it is implemented using a solenoid actuator. The reverse lockout valve actuator 126 thus includes a solenoid 128, which, at least in the depicted embodiment, is a pull-type solenoid that, when energized, moves the reverse lockout valve 104 from the closed position to the open position. As FIGS. 1-3 also depict, the solenoid 128 is spring-loaded, such that when the solenoid 128 is de-energized, the reverse lockout valve 104 is moved from the open position to the closed position.

The check valve 106 is disposed within a check valve body 132 and is movable between a closed position, which is the position depicted in FIGS. 1 and 2, and an open position, which is the position depicted in FIG. 3. The check valve body 132 includes a fluid inlet port 134 and a fluid outlet port 136. The fluid inlet port 134 is in fluid communication with the second head-end fluid port 114 and the second fluid control port 124, and the fluid outlet port 136 is in fluid communication with the first head-end fluid port 112 and the first fluid control port 122. Thus, as FIGS. 1 and 2 depict, when the check valve 106 is in the closed position, fluid is prevented from flowing through the check valve body 132 and into the first head-end fluid port 112. And, as FIG. 3 depicts, when the check valve 106 is in the open position, fluid may flow through the check valve body 132 and into the first head-end fluid port 112.

The propeller pitch control actuation system 100 may also include a position control valve 138. The position control valve 138 is disposed within a position control valve body 142, and is movable between three positions—a pitch locked position (FIG. 1), a reverse thrust position (FIG. 2), and a positive thrust position (FIG. 3). The position control valve body 142 includes a supply pressure port 144, a return pressure port 146, a head pressure port 148, and a rod pressure port 152. The supply pressure port 144 is adapted to receive a flow of pressurized fluid from a non-depicted fluid source, and the return pressure port 146 is adapted to return displaced fluid to a non-depicted fluid reservoir. The head pressure port 148 is in fluid communication with the second head-end fluid port 114 and the second fluid control port 124, the rod pressure port 152 is in fluid communication with the rod-end fluid port 116.

As FIG. 1 depicts, when the position control valve 138 is in the pitch locked position, the supply pressure port 144 and the return pressure port 146 are both fluidly isolated from the head pressure port 148 and the rod pressure port 152. As FIG. 2 depicts, when the position control valve 138 is in the reverse thrust position, the supply pressure port 144 is in fluid communication with the rod pressure port 152, and the return pressure port 146 is in fluid communication with the head pressure port 148. And, as FIG. 3 depicts, when the position control valve 138 is in the positive thrust position, the supply pressure port 144 is in fluid communication with the head pressure port 148, and the return pressure port 146 is in fluid communication with the rod pressure port 152.

Movement of the position control valve 138 is controlled by an actuator, which is referred to herein as a position control valve actuator 154. The position control valve actuator 154 is coupled to the position control valve 138 and is configured to selectively move the position control valve 138 between the pitch locked position, the reverse thrust position, and the positive thrust position. Although the position control valve actuator 154 may be implemented using any one of numerous known electric, hydraulic, or pneumatic actuators, in the depicted embodiment it is implemented using an electrohydraulic servo valve (EHSV).

The reverse lockout valve actuator 126 and the position control valve actuator 154 are each responsive to commands supplied from a control 160. The control 160 may be implemented using, for example, one or more processors, and may also be configured to implement the functions of, for example, an engine control unit (ECU) or full-authority digital engine control (FADEC). The control 160 is coupled to both the reverse lockout valve actuator 126 and the position control valve actuator 154, and is configured to command these actuators appropriately. In particular, the control 160 is configured to command the reverse lockout valve actuator 126 to move the reverse lockout valve 104 between the closed position and the open position, and to command the position control valve actuator 154 to move the position control valve 138 to the pitch locked position, the reverse thrust position, and the positive thrust position.

As FIGS. 1-3 also depict, the control 160 is coupled to receive what is referred to herein as a reverse thrust allowed signal 162. The control 160 is configured such that it is prevented from commanding the reverse lockout valve actuator 126 to move the reverse lockout valve 104 to the open position unless it receives the reverse thrust allowed signal 162. The reverse thrust allowed signal 162 is generated when the aircraft is in a configuration to allow reverse thrust propeller pitch angles. Such a configuration may be, for example, that the aircraft is on the ground. Thus, the source of the reverse thrust allowed signal 162 may be, for example, a weight-on-wheels (WOW) sensor.

The depicted propeller pitch control actuation system 100 additionally includes a position sensor 164. The position sensor 164 is coupled to, and is configured to sense the position of, the propeller pitch control actuator 102, and to supply a position signal representative of propeller pitch control actuator position to the control 160. Although the position sensor 164 may be variously implemented, in the depicted embodiment the positions sensor 164 is implemented using a linear variable differential transformer (LVDT) sensor.

Having described the configuration of the propeller pitch control actuation system 100, and the operation of its constituent components, a brief description of the operation of the system 100 as a whole will now be provided. With reference again to FIG. 1, the propeller pitch control actuator 102 is shown in the pitch locked position. The control 160 has de-energized the reverse lockout valve actuator 126, and the reverse lockout valve 104 is thus in its closed position. As noted above, when the reverse lockout valve 104 is in the closed position, fluid flow to and from the first head-end fluid port 112 via the reverse lockout valve body 118 is prevented. Thus, the propeller pitch control actuator 102 is hydraulically locked from traveling beyond the second head-end fluid port 114, and the propeller pitch control actuator 102 is prevented from moving to a reverse thrust position. A plurality of dynamic seals 156 on the propeller pitch control actuator 102 and a positive cutoff seat in the reverse lockout valve 104 prevent fluid leakage, thereby preventing the propeller pitch control actuator 102 from drifting into a reverse thrust position.

Referring now to FIG. 2, the propeller pitch control actuator 102 is depicted in a reverse thrust position. To achieve this position, the control 160 has energized the reverse lockout valve actuator 126, and the reverse lockout valve 104 is thus in its open position. The control 160 has also commanded the position control valve actuator 154 to move the position control valve 138 to the reverse thrust position. Of course, before supplying these commands, the control 160 received the reverse thrust allowed signal 162. As noted above, when the reverse lockout valve 104 is in the open position, fluid flow to and from the first head-end fluid port 112 via the reverse lockout valve body 118 is allowed, and when the position control valve 138 is in the reverse thrust position, the supply pressure port 144 is in fluid communication with the rod pressure port 152, and the return pressure port 146 is in fluid communication with the head pressure port 148. Because the head pressure port 148 is in fluid communication with the second head-end fluid port 114 and the second fluid control port 124, and the rod pressure port 152 is in fluid communication with the rod-end fluid port 116, the differential fluid pressure across the propeller pitch control actuator 102 will allow the propeller pitch control actuator 102 to move to the reverse thrust position. The seals 156 on the propeller pitch control actuator 102 isolate the head pressure port 148 and the rod pressure port 152.

With reference now to FIG. 3, the propeller pitch control actuator 102 is once again depicted in a reverse thrust position, but is being commanded to a positive thrust position. To do so, the control 160 has again de-energized the reverse lockout valve actuator 126, and the reverse lockout valve 104 is thus in its closed position. The control 160 has also commanded the position control valve actuator 154 to move the position control valve 138 to the positive thrust position. Because the reverse lockout valve 104 is in the closed position, fluid flow to and from the first head-end fluid port 112 via the reverse lockout valve body 118 is prevented. As noted above, when the position control valve 138 is in the positive thrust position, the supply pressure port 144 is in fluid communication with the head pressure port 148, and the return pressure port 146 is in fluid communication with the rod pressure port 152. Because the head pressure port 148 is in fluid communication with the fluid inlet port 134 on the check valve body 132, the check valve 106 is moved to the open position. When the check valve 106 is in the open position, the head pressure port 148 is in fluid communication with the first head-end fluid port 112, allowing fluid pressure in the head end pressure port 148 to move the propeller pitch control actuator 102 toward the positive thrust position.

The propeller pitch control actuation system 100 disclosed herein includes a relatively lightweight, relatively inexpensive means for selectively preventing the propeller pitch control actuator from commanding reverse pitch positions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propeller pitch control actuation system, comprising:
an actuator body including a first head-end fluid port, a second head-end fluid port, and a rod-end fluid port;
a propeller pitch control actuator movably disposed within the actuator body and movable, in response to differential fluid pressure between the rod-end fluid port and one or both of the first and second head-end fluid ports, to an actuator position;
a reverse lockout valve body having a first fluid control port and a second fluid control port, the first fluid control port in fluid communication with the first head-end fluid port, the second fluid control port in fluid communication with the second head-end fluid port;
a reverse lockout valve disposed within the reverse lockout valve body and selectively moveable between (i) a closed position, in which the valve prevents fluid flow to and from the first head-end fluid port via the reverse lockout valve body, and (ii) an open position, in which the valve allows fluid flow to and from the first head-end fluid port via the reverse lockout valve body;
a check valve body having a fluid inlet port and a fluid outlet port, the fluid inlet port in fluid communication with the second head-end fluid port and the second fluid control port, the fluid outlet port in fluid communication with the first head-end fluid port and the first fluid control port;
a check valve disposed within the check valve body and movable between (i) a closed position, in which fluid is prevented from flowing through the check valve body and into the first head-end fluid port, and (ii) an open position, in which fluid may flow through the check valve body and into the first head-end fluid port;
a position control valve body having a supply pressure port, a return pressure port, a head pressure port, and a rod pressure port, the head pressure port in fluid communication with the second head-end fluid port and the second fluid control port, the rod pressure port in fluid communication with the rod-end fluid port; and
a position control valve disposed within the position control valve body and moveable between a pitch locked position, a positive thrust position, and a reverse thrust position,
wherein:
in the pitch locked position, the supply pressure port and the return pressure port are both fluidly isolated from the head pressure port and the rod pressure port,
in the positive thrust position, the supply pressure port is in fluid communication with the head pressure port, and the return pressure port is in fluid communication with the rod pressure port, and
in the reverse thrust position, the supply pressure port is in fluid communication with the rod pressure port, and the return pressure port is in fluid communication with the head pressure port.

2. The system of claim 1, further comprising:
a reverse lockout valve actuator coupled to the reverse lockout valve, the reverse lockout valve actuator configured to selectively move the reverse lockout valve between the closed position and the open position.

3. The system of claim 2, wherein:
the reverse lockout valve actuator comprises a solenoid; and when the solenoid is energized, the reverse lockout valve actuator moves the reverse lockout valve from the closed position to the open position.

4. The system of claim 1, further comprising:
a position control valve actuator coupled to the position control valve, the position control valve actuator configured to selectively move the reverse lockout valve between the pitch locked position, the positive thrust position, and the reverse thrust position.

5. The system of claim 4, wherein the position control valve actuator comprises an electrohydraulic servo valve (EHSV).

6. The system of claim 1, further comprising:
a position sensor coupled to the propeller pitch control actuator and configured to sense a position of the propeller pitch control actuator.

7. A propeller pitch control actuation system, comprising:
an actuator body including a first head-end fluid port, a second head-end fluid port, and a rod-end fluid port;
a propeller pitch control actuator movably disposed within the actuator body and movable, in response to differential fluid pressure between the rod-end fluid port and one or both of the first and second head-end fluid ports, to an actuator position;
a reverse lockout valve body having a first fluid control port and a second fluid control port, the first fluid control port in fluid communication with the first head-end fluid port, the second fluid control port in fluid communication with the second head-end fluid port;
a reverse lockout valve disposed within the reverse lockout valve body and selectively moveable between (i) a closed position, in which the valve prevents fluid flow to and from the first head-end fluid port via the reverse lockout valve body, and (ii) an open position, in which the valve allows fluid flow to and from the first head-end fluid port via the reverse lockout valve body;
a reverse lockout valve actuator coupled to the reverse lockout valve, the reverse lockout valve actuator configured to selectively move the reverse lockout valve between the closed position and the open position;
a check valve body having a fluid inlet port and a fluid outlet port, the fluid inlet port in fluid communication with the second head-end fluid port and the second fluid control port, the fluid outlet port in fluid communication with the first head-end fluid port and the first fluid control port;
a check valve disposed within the check valve body and movable between (i) a closed position, in which fluid is prevented from flowing through the check valve body and into the first head-end fluid port, and (ii) an open position, in which fluid may flow through the check valve body and into the first head-end fluid port;

a control coupled to the reverse lockout actuator and configured to command the reverse lockout valve actuator to move the reverse lockout valve between the closed position and the open position; and
a position control valve body having a supply pressure port, a return pressure port, a head pressure port, and a rod pressure port, the head pressure port in fluid communication with the second head-end fluid port and the second fluid control port, the rod pressure port in fluid communication with the rod-end fluid port; and
a position control valve disposed within the position control valve body and moveable between a pitch locked position, a positive thrust position, and a reverse thrust position,
wherein:
in the pitch locked position, the supply pressure port and the return pressure port are both fluidly isolated from the head pressure port and the rod pressure port,
in the positive thrust position, the supply pressure port is in fluid communication with the head pressure port, and the return pressure port is in fluid communication with the rod pressure port, and
in the reverse thrust position, the supply pressure port is in fluid communication with the rod pressure port, and the return pressure port is in fluid communication with the head pressure port.

8. The system of claim 7, wherein:
the reverse lockout valve actuator comprises a solenoid;
the control selectively energizes and de-energizes the solenoid; and
when the solenoid is energized, the reverse lockout valve actuator moves the reverse lockout valve from the closed position to the open position.

9. The system of claim 7, further comprising:
a position control valve actuator coupled to the position control valve, the position control valve actuator configured to selectively move the reverse lockout valve between the pitch locked position, the positive thrust position, and the reverse thrust position.

10. The system of claim 9, wherein the control is further coupled to the position control valve actuator and is further configured to command the position control valve actuator to move the reverse lockout valve between the pitch locked position, the positive thrust position, and the reverse thrust position.

11. The system of claim 9, wherein the position control valve actuator comprises an electrohydraulic servo valve (EHSV).

12. The system of claim 7, further comprising:
a position sensor coupled to the propeller pitch control actuator and configured to sense a position of the propeller pitch control actuator.

* * * * *